(12) United States Patent
Li

(10) Patent No.: US 6,490,377 B1
(45) Date of Patent: Dec. 3, 2002

(54) OPTICAL INTERLEAVER

(75) Inventor: Wei-Zhong Li, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 0 days.

(21) Appl. No.: 09/562,847

(22) Filed: May 1, 2000

(51) Int. Cl.[7] ................................................ G02B 6/00
(52) U.S. Cl. ........................... 385/11; 385/24; 359/117; 359/122; 359/124
(58) Field of Search ............................... 385/11, 24, 27; 359/122, 128, 117, 114, 115, 497, 498

(56) References Cited

U.S. PATENT DOCUMENTS

| | | | |
|---|---|---|---|
| 5,694,233 A | 12/1997 | Wu et al. | 359/117 |
| 5,724,165 A | 3/1998 | Wu | 359/117 |
| 6,005,697 A * | 12/1999 | Wu et al. | 359/117 |
| 6,166,838 A * | 12/2000 | Liu et al. | 359/128 |
| 6,212,313 B1 * | 4/2001 | Lu | 385/24 |

* cited by examiner

*Primary Examiner*—Mark A. Robinson
(74) *Attorney, Agent, or Firm*—Fish & Richardson P.C.

(57) ABSTRACT

This invention provides a novel wavelength filter module that reduces the number of components required in an optical interleaver, and can be configured in various ways suitable for practical applications. An optical interleaver of the present invention incorporating such a wavelength filter module is simpler and more compact in design, lower in insertion losses, polarization dependent loss (PDL) and cost, while more reliable in performance. The optical interleaver of the present invention can be advantageously configured as a multiplexer, de-multiplexer, or a router.

34 Claims, 3 Drawing Sheets

OPTICAL INTERLEAVER

FIELD OF THE INVENTION

This invention relates generally to optical communications systems. More particularly, it provides a novel optical interleaver for multiplexing or de-multiplexing of optical signals.

BACKGROUND ART wavelength division multiplexing (WDM) has emerged as the standard technique to transmit information in fiber-optic networks. This is because as the bandwidth of fiber data increases, electronic sorting becomes increasingly complex, while wavelength routing becomes ever more practical and elegant.

In a WDM system, each optical fiber simultaneously carries many different communications channels in light of respectively different wavelengths. Each channel is modulated by one or more information signals. As a result, a significant number of information signals may be transmitted over a single optical fiber using WDM technology.

WDM systems use components generically referred to as optical interleavers to combine, split, or route optical signals of different channels. Interleavers typically fall into one of three categories, multiplexers, de-multiplexers and routers.

A multiplexer takes optical signals of different channels from two or more different input ports and combines them so that they may be coupled to an output port for transmission over a single optical fiber. A de-multiplexer performs the opposite process, that is, it decomposes an optical signal containing two or more different channels according to their wavelength ranges and directs each channel to a different dedicated fiber. A router works much the same way as a de-multiplexer; however, a router can selectively direct each channel according to control signals to a desired coupling between an input channel and an output port.

FIG. 1 depicts a typical optical interleaver 999 of the prior art as described in U.S. Pat. No. 5,694,233, issued to Wu et al. on Dec. 2, 1997, which is incorporated herein by reference for all purposes. A WDM signal 500 containing two different channels 501, 502 enters interleaver 999 at an input port 11. As used herein, the term "channel" refers to a particular range of wavelengths or frequencies that defines a unique information signal. A first birefringent element 30 spatially separates WDM signal 500 into horizontal and vertically polarized components 101 and 102 by a horizontal walk-off. Component signals 101 and 102 both carry the full frequency spectrum of the WDM signal 500.

Components 101 and 102 are coupled to a polarization rotator 40. The rotator 40 selectively rotates the polarization state of either signal 101 or 102 by a predefined amount. By way of example, in FIG. 1 signal 102 is rotated by 90° so that signals 103, 104 exiting rotator 40 are both horizontally polarized when they enter a wavelength filter 61.

Wavelength filter 61 selectively rotates the polarization of wavelengths in either the first or second channel to produce filtered signals 105 and 106. For example, wavelength filter 61 rotates wavelengths in the first channel 501 by 90° but does not rotate wavelengths in the second channel 502 at all.

The filtered signals 105 and 106 enter a second birefringent element 50 that vertically walks off the first channel into beams 107, 108. The second channel forms beams 109, 110.

A second wavelength filter 62 then selectively rotates the polarizations of signals 107 and 108, but not signals 109 and 110, thereby producing signals 111, 112, 113, 114 that have polarizations parallel each other. A second polarization rotator 41 then rotates the polarizations of signals 111 and 113, but not 112 and 114. The resulting signals 115, 116, 117, and 118 then enter a third birefringent element 70. Note that second wavelength filter 62 may alternatively be replaced by a polarization rotator 41 suitably configured to rotate the polarizations of signals 111 and 113, but not 112 and 114.

Third birefringent element 70 combines signals 115 and 116, into the first channel, which is coupled to output port 14. Birefringent element 70 also combines signals 117 and 118 into the second channel, which is coupled into output port 13.

As described above, interleaver 999 operates as a de-multiplexer. By operating interleaver 999 in reverse, i.e., starting with channels 501, 502 at ports 13 and 14 respectively, interleaver operates as a multiplexer.

Furthermore, by suitably controlling the polarization rotation induced by rotators 40 and 41, interleaver 999 may be configured to operate as a router.

Polarization rotators used in interleaver 999 contribute to insertion losses in the system. Moreover, these polarization rotators should be zero-order in order to cover a wide bandwidth. Such zero-order plates are however very thin (<0.3 mm), therefore difficult and costly to manufacture.

When interleaver 999 is used as a multiplexer, or in the case where high degree isolation is not required, a single stage interleaver can be used, as shown in FIG. 2. In this prior art, light beam 116 goes through two polarization rotators 40 and 41, while beam 115 travels through only the air. Thus, beam 116 suffers greater loss than beam 115, which causes higher polarization dependent loss (PDL).

What is needed in the art, therefore, is a simpler, more compact and cost-effective optical interleaver that overcomes the shortcomings of the prior art systems and provides more reliable performance.

OBJECTS AND ADVANTAGES

Accordingly it is a principal object of the present invention to provide a novel wavelength filter module that enables an optical interleaver to be simpler and more compact in structure, thereby providing more reliable performance and lower PDL. It is another object of the present invention to provide methods for constructing optical interleavers that incorporate such wavelength filter modules.

An important advantage of the wavelength filter module of the present invention is that it reduces the number of components required in an optical interleaver, and can be configured in various ways suitable for practical applications. As a consequence, the optical interleaver of the present invention is more compact in design, lower in insertion losses, PDL and cost, while more reliable in performance.

These and other objects and advantages will become apparent from the following description and accompanying drawings.

SUMMARY OF THE INVENTION

The present invention provides a wavelength filter module comprising two or more wavelength filters with different predetermined spectral responses, arranged in a "side-by-side" fashion. The wavelength filter module is configured to receive a plurality of input optical signals, where each optical signal passes through only one dedicated wavelength filter. The dedicated wavelength filter selectively passes a predetermined range of wavelengths of the input optical signal with a first polarization and a complementary range of wavelengths of the input optical signal in a second polarization that is orthogonal to the first polarization. Each wavelength filter may be formed from a stacked plurality of birefringent waveplates with each waveplate oriented in a predetermined direction with a different length. The constituent wavelength filters of the module may be configured to have different predetermined orientations, or thicknesses, so as to provide different spectral responses.

The present invention also provides an optical interleaver that employs the wavelength filter module described above. The interleaver generally comprises a first birefringent element that decomposes and spatially separates an input WDM signal containing first and second spectral channels into first and second beams that have orthogonal polarizations. The first and second spectral channels are substantially complementary. A first wavelength filter module is optically coupled to receive the first and second beams, and decomposes the first beam into third and fourth beams with orthogonal polarizations and the second beam into fifth and sixth beams with orthogonal polarizations. The first wavelength filter module is configured such that the third and fifth beams carry the first channel at a vertical polarization, while the fourth and sixth beams carry the second channel at a horizontal polarization. A second birefringent element, optically coupled to the first wavelength filter module, spatially separates the four beams into four horizontally and vertically polarized components, which in turn enter a second wavelength filter module. The third and fourth beams become both vertically polarized but remain spatially separated, and the fifth and sixth beams become both horizontally polarized but remain spatially separated, after passing through the second wavelength filter module. A third birefringent element, optically coupled to the second wavelength filter module, then recombines the third and fifth beams containing the first channel into a first output signal and the fourth and sixth beams containing the second channel into the second output signal. The two output signals are further directed to two output ports.

Each of the first and second wavelength filter modules comprises two wavelength filters with different predetermined spectral responses. The design of each module is such that it advantageously provides the combined function of a polarization rotator and a wavelength filter in an optical interleaver, such as that of the polarization rotator 40 and the wavelength filter 61, or that of the wavelength filter 62 and the polarization rotator 41, in the prior art optical interleaver shown in FIG. 1. The optical interleaver incorporating such a module has fewer components, therefore suffering lower insertion losses, PDL and cost, while providing more reliable performance.

The optical interleaver of the present invention can be configured to operate as a multiplexer, a de-multiplexer, or a router, as depicted in the drawings and the detailed description that follow.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

Figure 3:
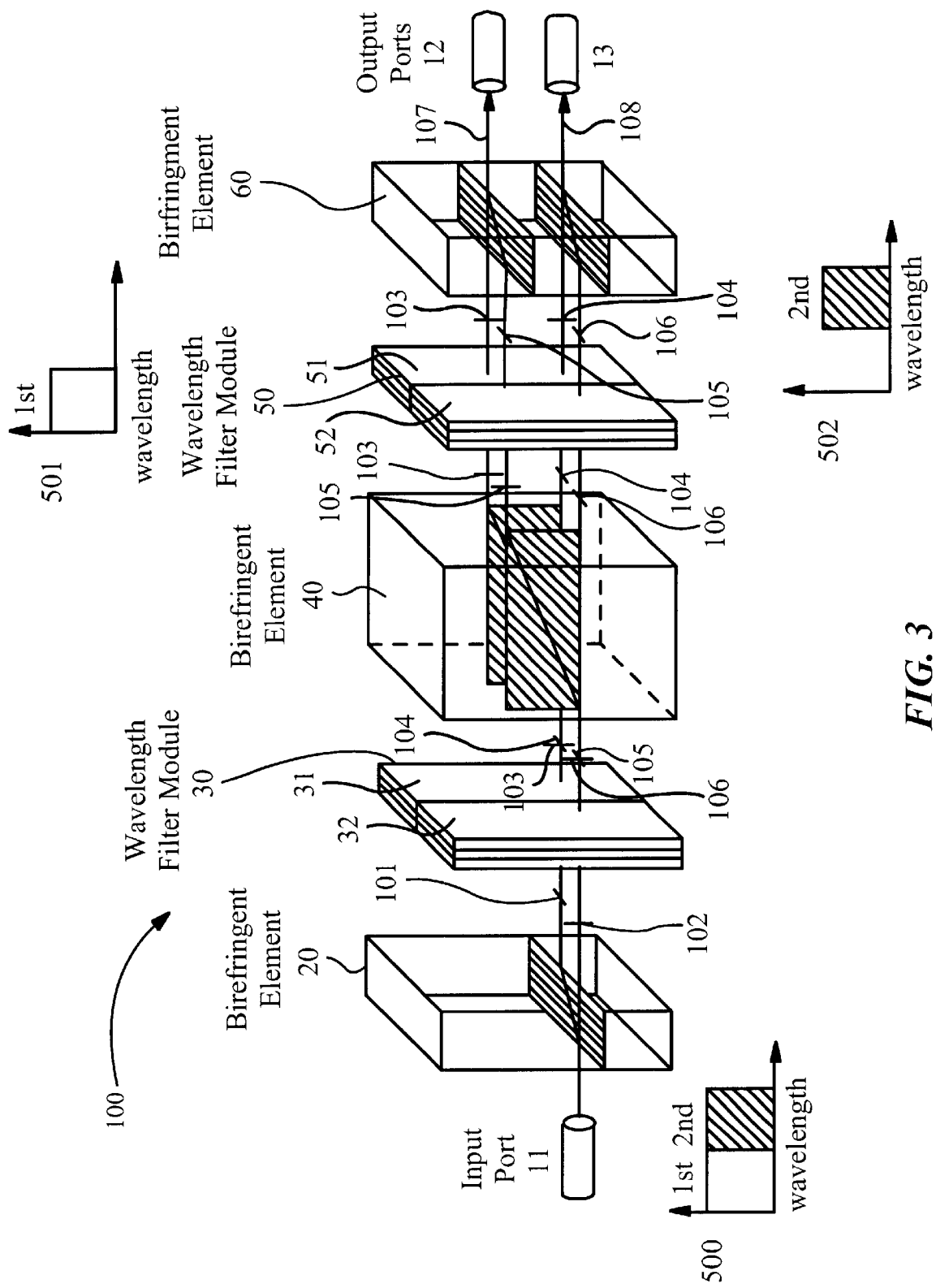
FIG. 3 depicts an isometric representation of an exemplary embodiment of an optical interleaver according to the present invention.

FIG. 3 depicts an exemplary embodiment of an optical interleaver according to the present invention. A WDM signal 500 carrying two distinct channels 501, 502 in its spectrum enters interleaver 100 at an input port 1. As used herein, the term "channel" refers to a particular range of wavelengths or frequencies that defines a unique information signal. A first birefringent element 20 spatially separates the WDM signal 500 into horizontally and vertically polarized components, such that the vertically polarized component 102 30 travels as an ordinary ray and passes through without changing course, while the horizontally polarized component 101 travels as an extraordinary beam and consequently walks off from its original course. It should be noted that beams 101 and 102 both comprise the full spectrum of the WDM signal 500.

A first wavelength filter module 30, comprising a first wavelength filter 31 and a second wavelength filter 32, is optically coupled to receive the first and second beams 101, 202 from the first birefringent element 20. The first wavelength filter 31 is configured such that it decomposes the first beam 101 into a third beam 103 with a vertical polarization and a fourth beam 104 with a horizontal polarization. The second wavelength filter 32 is configured such that it decomposes the second beam 102 into a fifth beam 105 with a vertical polarization and a sixth beam 106 with a horizontal polarization. Note that the third and fifth beams 103, 105 carry the first channel 501, whereas the fourth and sixth beams 104, 106 carry the second channel 502. Thus, the first wavelength filter module 30 separates different spectral channels by way of different polarizations.

A second birefringent element 40 is optically coupled to the first wavelength filter module 30 and spatially separates the four beams into four horizontally and vertically polarized components by way of the birefringent walk-off effect. It is configured such that the vertically polarized beams 103, 105 walk off as extraordinary rays while the horizontally polarized beams 104, 106 pass through without changing course as ordinary rays.

Following the second birefringent element 40, the optical elements on the input side of the second birefringent element 40 can be repeated in opposite order. A second wavelength filter module 50, comprising a third wavelength filter 51 and 30 a fourth wavelength filter 52, is optically coupled to receive the four polarized components from the second birefringent element 40. The third wavelength filter passes the third beam 103 carrying the first channel without changing its polarization state, however rotates the polarization state of the fourth beam 104 carrying the second channel by 90, such that the third and fourth beams 103, 104 become both vertically polarized, but remain spatially separated, after traversing through the third wavelength filter 51. In contrast, the fourth wavelength filter 52 passes the sixth beam 106 carrying the second channel without changing its polarization state, but rotates the polarization state of the fifth beam 105 carrying the first channel by 90°, such that the fifth and sixth beams 105, 106 become both horizontally polarized, but remain spatially separated, after traversing through the fourth wavelength filter 52. Moreover, all four beams are further purified upon exiting from the second wavelength module 50.

Finally, a third birefringent element 60, optically coupled to the second wavelength filter module 50, uses the birefringent walk-off effect to recombine the third and fifth beams 103, 105 carrying the first channel 501 into a first output signal 107, and the fourth and sixth beams 104, 106 carrying the second channel 502 into a second output signal 108. The two output signals are further directed to two output ports 12 and 13, respectively.

The first, second, and third birefringent elements typically comprise birefringent materials such as calcite, rutile, lithium niobate, and $YVO_4$ based crystals. Each wavelength filter can be made of a stacked plurality of birefringent waveplates with each waveplate oriented in a predetermined direction with a different length, so as to pass a selected range of wavelengths with horizontal polarization and a complimentary set of wavelengths with vertical polarization. For wavelength demultiplexing applications, the wavelength filter usually has a comb filter response curve with substantially flat top or square wave spectral response. Moreover, the two constituent wavelength filters in either of the wavelength filter modules 30 and 50 may have different predetermined orientations or thicknesses, so as to provide different spectral responses.

Figure 1:
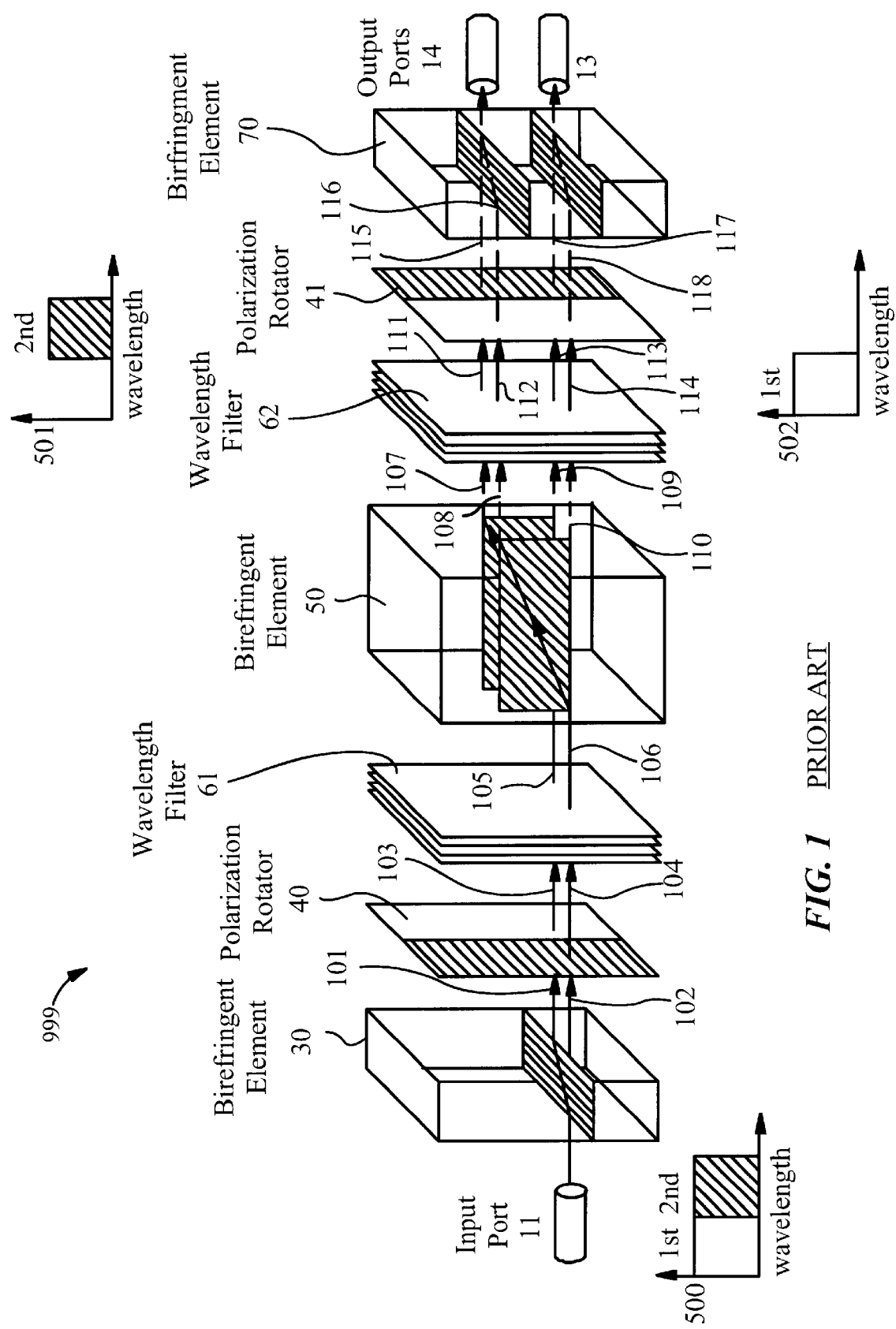
FIG. 1 shows an isometric representation of an optical interleaver according to the prior art.
Figure 2:
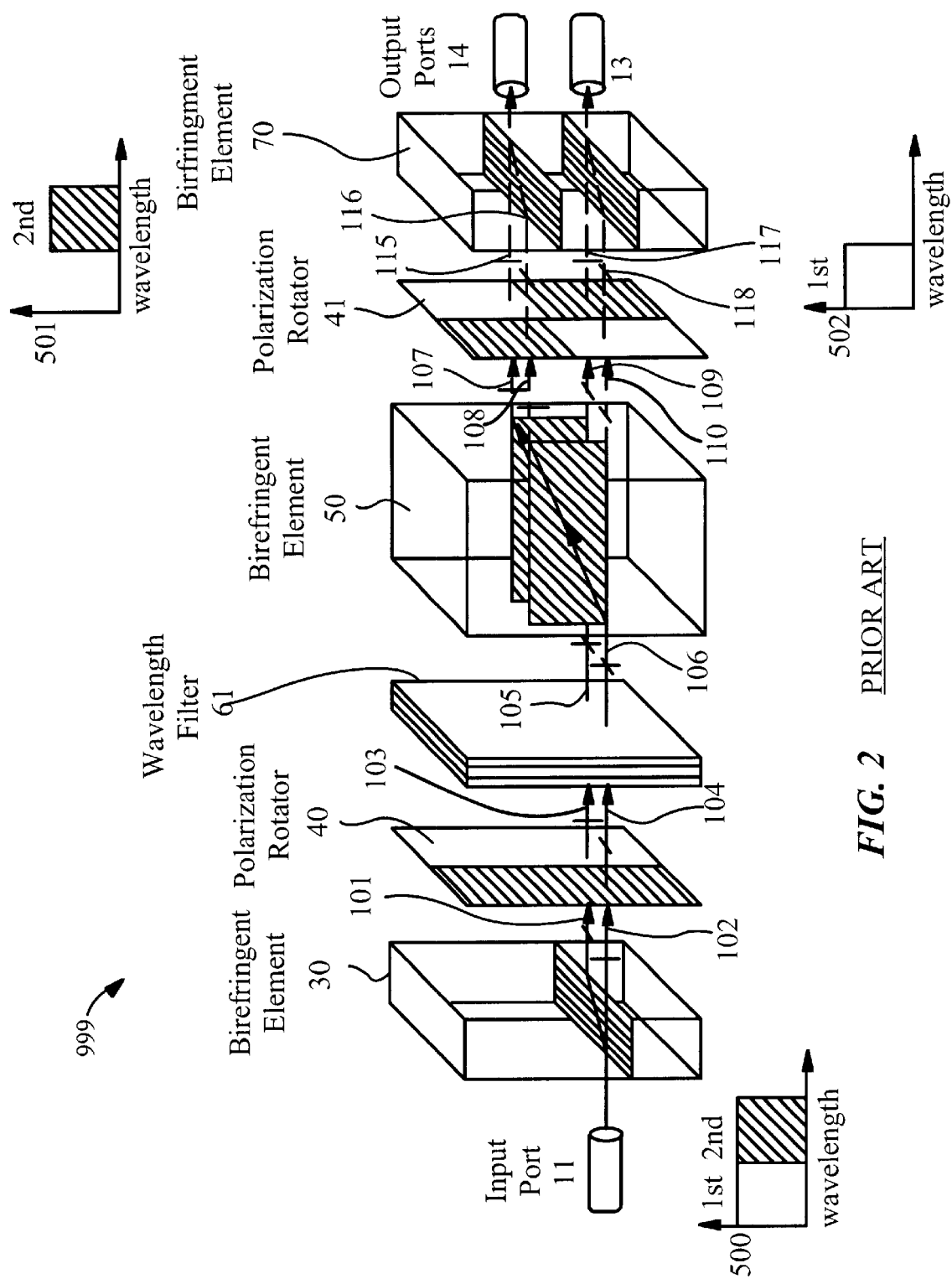
FIG. 2 shows an isometric representation of another optical interleaver according to the prior art.

An important feature of the optical interleaver of the present invention is that by employing wavelength filter modules, each comprising two wavelength filters with different spectral responses, the need for polarization rotators, as those used in the prior art interleavers shown in FIGS. 1 and 2, is eliminated. This design has the advantage of reducing the number of components in the optical interleaver and thereby improving its performance.

Moreover, the design of the optical interleaver in FIG. 3 allows the optical path lengths of light rays in different polarization modes to be optimally equalized. This can be achieved by using the third birefringent element to compensate for whatever difference in optical path lengths an optical signal has incurred upon entering it. A further advantage of the optical interleaver in FIG. 3 is that routing is accomplished while conserving substantially all optical energy available in the input WDM signal. That is, both the horizontal and vertical polarized components are used and recombined at the output ports, resulting very few loss through the interleaver.

Optical interleaver 100 in FIG. 3 operates as a de-multiplexer. By operating interleaver 100 in reverse, i.e., starting with channels 501, 502 at ports 12 and 13 respectively, interleaver 100 provides a multiplexer. Furthermore, by suitably controlling the polarization rotation induced by wavelength filter modules 30 and 50, interleaver 100 may be configured to operate as a router.

Those skilled in the art will recognize that various alterations and substitutions can be further introduced to optical interleaver 100 depicted in FIG. 3. For instance, the second wavelength filter module 50 may alternatively be replaced by a polarization rotation means suitably configured to rotate the polarizations of beams 104 and 105, but not 103 and 106. Such a polarization rotation means can be made of two sub-rotators arranged to selectively intercept and rotate the beams.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. An optical apparatus comprising a wavelength filter module, wherein said wavelength filter module comprises a plurality of wavelength filters, wherein said plurality of wavelength filters are arranged in a side-by-side fashion such that upon receiving a plurality of input optical signals, each of said input optical signals passes through only one of said wavelength filters, and wherein each of said wavelength filters selectively passes a predetermined range of wavelengths of each of said input optical signals with a first polarization and a complimentary range of wavelengths of each of said input optical signals with a second polarization that is orthogonal to said first polarization.

2. The optical apparatus of claim 1 wherein each filter in said plurality of wavelength filters comprises a birefringent material.

3. The optical apparatus of claim 2 wherein each of said wavelength filters comprises a stacked plurality of birefringent waveplates with each waveplate oriented in a predetermined direction.

4. The optical apparatus of claim 2 wherein said plurality of wavelength filters have different predetermined orientations, so as to provide different spectral responses.

5. The optical apparatus of claim 2 wherein said plurality of wavelength filters have different predetermined thicknesses, so as to provide different spectral responses.

6. The optical apparatus of claim 1 further comprising a first birefringent element optically coupled to said wavelength filter module, such that said wavelength filter module receives optical signals exiting from said first birefringent element.

7. The optical apparatus of claim 1 further comprising a second birefringent element optically coupled to said wavelength filter module, such that said second birefringent element receives optical signals exiting from said wavelength filter module.

8. An optical apparatus comprising:
    a) a first birefringent element for receiving a wavelength division multiplexed (WDM) signal and decomposing said WDM signal into a first beam and a second beam that are orthogonally polarized and spatially separated;
    b) a first wavelength filter module comprising first and second wavelength filters optically coupled to receive said first and second beams from said first birefringent element respectively, wherein said first wavelength filter decomposes said first beam into a third beam and a fourth beam with their polarizations orthogonal to each other and said second wavelength filter decomposes said second beam into a fifth beam and a sixth beam with their polarizations orthogonal to each other, wherein said third and fifth beams carry a first range of wavelengths at a vertical polarization and said fourth and sixth beams carry a second range of wavelengths at a horizontal polarization, and wherein said first and second ranges of wavelengths are substantially complementary;
    c) a second birefringent element optically coupled to receive said third, fourth, fifth, and sixth beams from said first wavelength filter module, wherein said third, fourth, fifth, and sixth beams are spatially separated into four horizontally and vertically polarized components;
    d) a polarization rotation means optically coupled, to receive said third, fourth, fifth, and sixth beams from said second birefringent element, wherein said third and fourth beams become both vertically polarized but remain spatially separated after passing through said polarization rotation means, and said fifth beam and sixth beam become both horizontally polarized but remain spatially separated after passing through said polarization rotation means;

e) a third birefringent element optically coupled to receive said third, fourth, fifth, and sixth beams from said polarization rotation means, wherein said third and fifth beams carrying said first range of wavelengths are spatially combined into a first output signal, and said fourth and sixth beams carrying said second range of wavelengths are spatially combined into a second output signal.

9. The optical apparatus of claim 8 wherein said first and second wavelength filters comprise birefringent materials.

10. The optical apparatus of claim 9 wherein either of said first and second wavelength filters comprises a stacked plurality of birefringent waveplates with each waveplate oriented in a predetermined direction.

11. The optical apparatus of claim 9 wherein said first and second wavelength filters have different predetermined orientations.

12. The optical apparatus of claim 9 wherein said first and second wavelength filters have different predetermined thicknesses.

13. The optical apparatus of claim 8 wherein said polarization rotation means is a second wavelength filter module comprising third and fourth wavelength 4 filters, wherein said third and fourth wavelength filters are arranged such that said third and fourth beams become both vertically polarized but remain spatially separated after passing through said third wavelength filter, and said fifth beam and sixth beam become both horizontally polarized but remain spatially separated after passing through said fourth wavelength filter, respectively.

14. The optical apparatus of claim 13 wherein said third and fourth wavelength filters comprise birefringent materials.

15. The optical apparatus of claim 14 wherein either of said third and fourth wavelength filters comprises a stacked plurality of birefringent waveplates with each waveplate oriented in a predetermined direction.

16. The optical apparatus of claim 14 wherein said third and fourth wavelength filters have different predetermined thicknesses.

17. The optical apparatus of claim 8 wherein said polarization rotation means comprises a plurality of polarization rotators, arranged to selectively intercept and rotate said third, fourth, fifth and sixth beams.

18. The optical apparatus of claim 8 wherein said first birefringent element comprises a material selected from a group consisting of calcite, rutile, lithium niobate, and $YVO_4$ based materials.

19. The optical apparatus of claim 8 wherein said second birefringent element comprises a material selected from a group consisting of calcite, rutile, lithium niobate, and $YVO_4$ based materials.

20. The optical apparatus of claim 8 wherein said third birefringent element comprises a material selected from a group consisting of calcite, rutile, lithium niobate, and $YVO_4$ based materials.

21. The optical apparatus of claim 8 further comprising at least one input port from which said input optical signal emerges.

22. The optical apparatus of claim 21 wherein said input port includes a collimator coupled to at least one optical fiber.

23. The optical apparatus of claim 8 further comprising at least two output ports receiving said first and second output optical signals, respectively.

24. The optical apparatus of claim 23 wherein at least one of said output ports includes a collimator coupled to at least one optical fiber.

25. A method of routing a wavelength division multiplexed (WDM) optical signal, comprising the steps of:
a) providing a first input/output (I/O) port for receiving said WDM optical signal;
b) providing a second I/O port and a third I/O port;
c) spatially decomposing said WDM signal received from said first I/O port into a first beam and a second beam having orthogonal polarizations with respect to each other;
d) de-multiplexing said first and second beams through a wavelength filter module, such that said first beam decomposes into a third beam and a fourth beam with their polarizations orthogonal to each other and said second beam decomposes into a fifth beam and a sixth beam with their polarizations orthogonal to each other, wherein said third and fifth beams carry a first range of wavelengths at a vertical polarization and said fourth and sixth beams carry a second range of wavelengths at a horizontal polarization, and wherein said first range of wavelengths is substantially complementary to said second range of wavelengths;
e) spatially routing said third, forth, fifth, and sixth beams according to their polarizations;
f) passing said routed third, forth, fifth, and sixth beams through a polarization rotation means, such that emerging from said polarization rotation means, said third and fourth beams are both vertically polarized but remain spatially separated, and said fifth beam and sixth beam are both horizontally polarized but remain spatially separated;
g) spatially combining said third and fifth beams carrying said first range of wavelengths into a first output optical signal, and spatially combining said fourth and sixth beams carrying said second range of wavelengths into a second output optical signal;
h) coupling said first optical signal to said second I/O port and said second optical signal to said third I/O port.

26. The method of claim 25 wherein said step of decomposing said WDM optical signal uses a first birefringent element.

27. The method of claim 25 wherein said step of spatially routing said third, fourth, fifth, and sixth beams uses a second birefringent element.

28. The method of claim 25 wherein said step of spatially recombining said third, fourth, fifth, and sixth beams uses a third birefringent element.

29. The method of claim 25 wherein either of said first and second wavelength filters modules comprises at least two wavelength filters arranged in a side-by-side fashion.

30. The method of claim 29 wherein said wavelength filters comprise birefringent materials with different predetermined orientations.

31. The method of claim 29 wherein said wavelength filters comprise birefringent materials with different predetermined thicknesses.

32. The method of claim 29 wherein either of said wavelength filters comprise a stacked plurality of birefringent waveplates with each waveplate oriented in a predetermined direction.

33. The method of claim 25 wherein said polarization rotation means comprises a second wavelength filter module, wherein said second wavelength filter module further comprises third and fourth wavelength filters configured to have different predetermined spectral responses.

34. The method of claim 25 wherein said polarization rotation means comprises a plurality of polarization rotators, arranged to selectively intercept and rotate said third, fourth, fifth and sixth beams.

* * * * *